Figure 1:
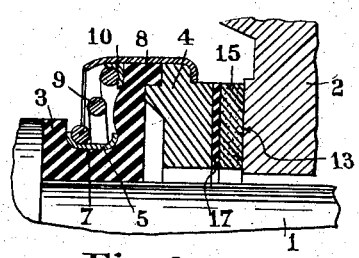

April 28, 1959   M. AMIRAULT ET AL   2,884,268
PACKING SEALS FOR USE BETWEEN A ROTATABLE AND A FIXED PART
Filed March 9, 1954   4 Sheets-Sheet 1

United States Patent Office 2,884,268
Patented Apr. 28, 1959

2,884,268

PACKING SEALS FOR USE BETWEEN A ROTATABLE AND A FIXED PART

Maxime Amirault, Puteaux, and Paul Destoumieux, Neuilly-sur-Seine, France

Application March 9, 1954, Serial No. 415,098

Claims priority, application France March 10, 1953

3 Claims. (Cl. 286—11.15)

When a tight packing seal must be interposed between a fixed part and a movable part, and more particularly whenever this latter is a rotatable shaft, devices are commonly used which consist in a friction ring provided around the shaft and connected to this latter through the medium of an elastic member, for instance a membrane, and having one of its faces in engagement with one face provided on the casing intended to be rendered tight or on a main part fixed thereto.

This friction ring is generally made from a self-lubricating moulded material, for instance from graphite agglomerated with Bakelite. It is well known that this latter substance is capable of variations in its dimensions, notably when the temperature happens to fluctuate.

Consequently, in operating condition and particularly owing to the elevation of temperature produced by the friction, the aforesaid material is frequently deformed, which results, chiefly during the earliest moments of each operation period, in leakages which are sometimes so great that such a packing seal cannot be practically utilized.

In order to lessen the deformation of this material, this latter can be reinforced. However, as the moulded material and the reinforcement metal have largely different coefficients of expansion, the reinforced material is nevertheless deformed.

According to this invention, these difficulties have been successfully obviated.

This invention has for its object packing seals to be interposed between a fixed part and a movable part and wherein the tightness is obtained between plane or conical faces in motion relatively to one another, one of these faces being provided on the fixed part, the other on the movable part, these packing seals being characterized in that a thin friction washer is interposed between the aforesaid faces of the fixed and of the movable parts.

In these packings, the friction washer is preferably flat and ring-shaped and is pressed between two rigid and parallel faces, one of them being provided on the fixed part and the other on a movable part, these faces being permanently urged towards each other by resilient means in order to exert a pressure on the friction washer.

According to a first embodiment of the device, the friction washer is fixed to one of the two parts, the movable or the fixed one, through the medium of a resilient connecting means.

This resilient connection may be embodied by sticking the washer on one of the foresaid movable or fixed parts, by means of an elastic paste, for instance made chiefly from rubber, Bakelite and cellulose.

This resilient connection can be embodied by interposing a thin sheet of rubber or of any elastic material between the frictional washer and the fixed or movable part whereto this washer is attached.

The frictional washer may be resiliently attached on a removable part, fixed to the fixed or to the movable part.

According to another embodiment of the device, the friction washer may be left free in rotation between the fixed and movable parts between which it is interposed, this washer being held in position by an inner or an outer adjusting member.

Other objects and particular features of the invention will be pointed out in the following description of various embodiments of the same which are given by way of example hereinafter, reference being had to the appended drawing.

In this drawing, the Figs. 1 to 21 are half sectional views of different embodiments of the invention the section in each instance being taken on a plane including the axis of the shaft.

The packing seal shown in Fig. 1 is intended to be interposed in tight relationship between a shaft 1 and a casing 2. It comprises several members firm in rotation with shaft 1, which are: a sleeve 3 made of rubber or any other elastic material and secured to the shaft 1; a rigid ring 4 made of cast iron or any other stable metal; a metal ring 5 surrounding the groove 7 of the sleeve 3; another metal ring 8 securing to each other the members 3 and 4, the peripheral portions of which are clamped together all around by said metal ring; a cone-shaped spring 9 made of wire and compressed according to its axial direction between an end flange of the ring 5 and a ring-shaped member 10 having an L-shaped cross-section and firm with the clamping ring 8.

A frictional ring-shaped washer 15 is pressed between the plane side-face of the rigid ring 4 driven in rotation by the shaft 1, and a shoulder 13 of the fixed casing 2. This friction washer 15, which is a characteristic member of this invention, is a thin washer having a thickness of about 2 millimeters or of several millimeters. It is provided with plane faces. It is made from a material suitable to frictional engagement, for instance from such a moulded self-lubricating material, as graphite agglomerated with Bakelite. The ring 4 and the shoulder 13, between which the washer 15 is interposed, are made from a stable metal, for instance from cast iron.

Although this annular washer 15 should be capable of variations in its dimensions, it is thus obliged to remain parallel with the end face of the aforesaid ring 4 and with the shoulder 13, any expansion having practical effects only according to the diametral directions.

This washer 15 is held in position owing to the fact it is stuck on the ring 4, a thin sheet 17 of rubber being interposed between said washer and said ring. This ring-shaped washer 15 may be also either affixed with a resilient paste, for instance made chiefly from rubber, Bakelite or cellulose, or quite free, being adjusted in position by inner or outer guide means. Embodiments of this kind will be further described.

Figure 2:
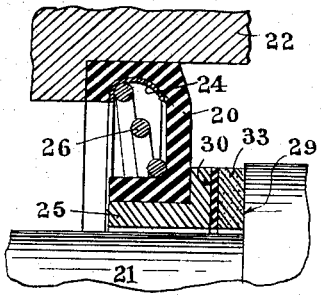

The packing seal shown in Fig. 2 is to be interposed in tight relationship between the shaft 21 and the casing 22. It comprises the following members firm with casing 22:

A rubber sleeve 20 secured to the casing 22.
A metal ring 24 set in the upper groove of the sleeve 20.
A cone-shaped spring 26 compressed according to its axial direction between a flange of the ring 24 and an annular recess of the rubber sleeve 20.

The cone-shaped spring 26 permanently urges the rigid ring 25 towards the shoulder 29 of the shaft 21. Against the side-face 30 of the ring 25 is stuck a thin annular washer 33 made from a material suitable for frictional engagement, for instance a material comprising chiefly carbon. This washer is constricted between said face 30 of the ring 25 and the shouldering 29 of the shaft 21. Consequently, it can be deformed only according the radial directions, whereby a very good tightness is obtained between shaft 21 and casing 22.

Figure 3:
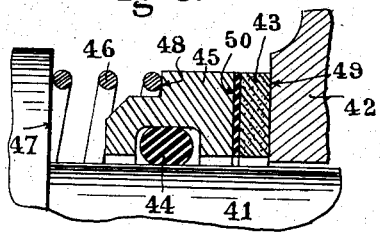

The packing as represented in Fig. 3 is destined to secure tightness between the shaft 41 and the casing 42. It comprises the following members firm with the shaft 41:

A rigid ring 45 made from a stable metal, for example from cast iron, surrounding the shaft 41 with a rubber pad 44 interposed therebetween for tightness.

A cone-shaped spring 46 resting upon a shouldering 47 of shaft 41 and upon a shouldering 48 of the ring 45.

On the end face 50 of the ring 45 there is a washer 43 made from a matter suitable for frictional engagement. This washer is pressed between said face 50 of ring 45 and shouldering 49 of the casing 42.

Figure 4:
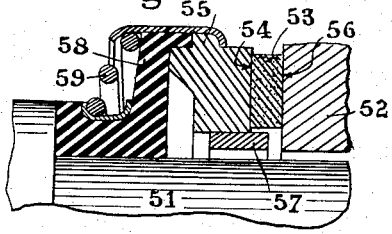

The packing seal shown in Fig. 4 is intended to secure tightness between the shaft 51 and the casing 52. It is similar to that shown in Fig. 1, but with the following differences:

The ring-shaped friction washer 53 is not attached either on the face 54 of the ring 55 made from a stable metal, nor to the shoulder 56 of the casing 52. It is held in position by a centering-ring 57 positioned inside the annular frictional washer 53 and secured to the ring 55. The spring 59 urges the ring 55 towards the shouldering 56 and presses thus the washer 53. This spring 59 is set in the annular recess of a rubber sleeve 58 secured to the shaft 51.

Figure 5:
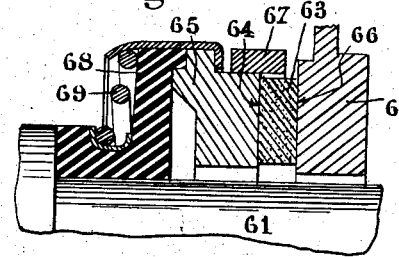

The packing seal shown in Fig. 5 is intended to provide for tightness between the shaft 61 and the casing 62. It is similar to that shown in Fig. 4, but with this difference that the ring-shaped friction washer 63 is pressed between the face 64 of the ring 65 and the shouldering 66 of the casing 62, and is held in position by an external centering ring 67 secured to the ring 65.

Figure 15:
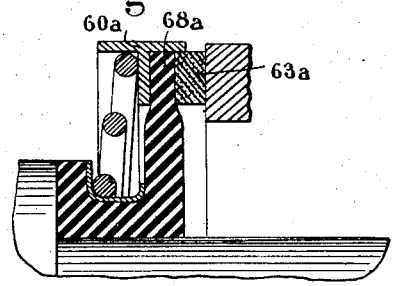
Figure 16:
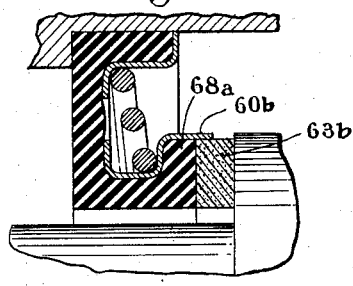

Besides, according to the invention and as shown in Figs. 15 and 16, the friction washer 63a or 63b may be directly secured to a rubber member forming a part of the packing, for instance to the collar or membrane 68a or 68b, this latter part being supported by a rigid ring-shaped member 60a or 60b.

Just as in the device shown in Fig. 1, it is the spring 69 set in the rubber collar 68, which urges the ring 65 towards the shoulder 66 and which thus compresses the ring-shaped friction washer 63.

Figure 6:
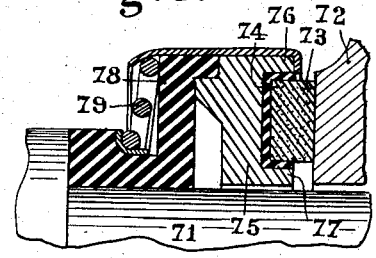

The washer shown in Fig. 6 and interposed for tightness between shaft 71 and casing 72 is of a similar kind to that of both preceding packings, with that difference however that the ring 75 made from a stable metal is provided with two annular extensions 76, 77 securing the centering of the ring-shaped friction washer 73. This latter is affixed on the ring 75 through the medium of a thin rubber plate 74.

In the same way as in the devices of Figs. 1 to 5, the ring 75 is urged towards the casing 72 by a spring 79 placed in the annular recess of a rubber collar 78.

Figure 7:
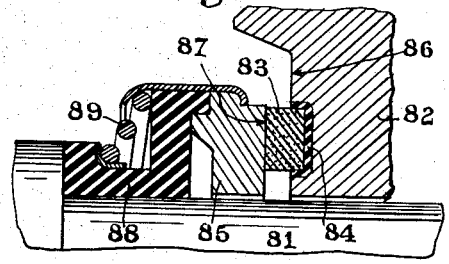

The joint shown in Fig. 7 is interposed for tightness between shaft 81 and casing 82, and comprises a ring-shaped friction washer 83 which is affixed through the medium of a rubber sheet 84 on the inner surface of an annular groove provided on the face 86 of the casing 82. The friction washer 83 is also in engagement with the face 87 of the ring 85, this latter being made from cast iron or from any other stable metal. This ring 85 is urged towards the casing 82 by a cone-shaped ring 89 mounted in a rubber collar 88 secured to the shaft 81.

Figure 8:
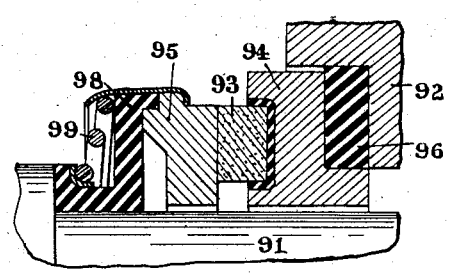

The packing represented in Fig. 8 is an embodiment similar to that of Fig. 7, with the difference that the friction washer 93, instead of being directly mounted upon the casing 92 in order to frictionally engage the ring 95 firm with the shaft 91, is on a ring 94 attached to the casing, a resilient washer 96 being interposed therebetween. In this device, it is a cone-shaped spring 99 located in a rubber collar 98 which thrusts the ring 95 towards the attached ring 94 and presses thus the frictional washer 93.

Figure 9:
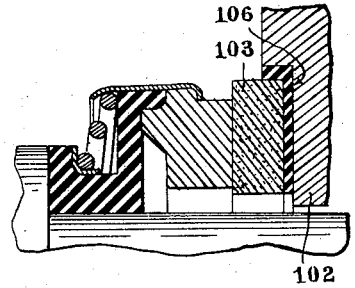

The packing shown in Fig. 9 is very similar to that of Fig. 7 with this slight difference that the washer 103, instead of being set in an annular groove of the casing 102, is placed in an annular recess 106 having a single edge located on the external side.

Figure 10:
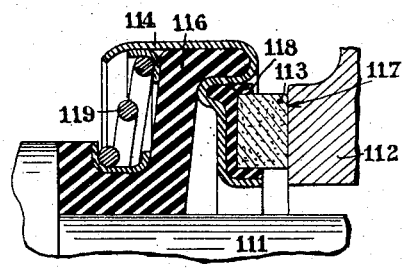
Figure 11:
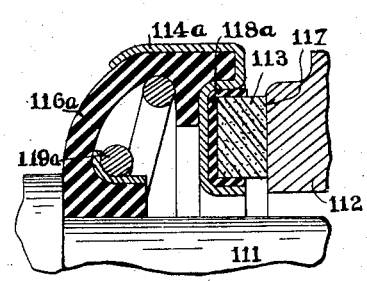

The Figs. 10 and 11 show embodiments of packings wherein the friction washer 113 is fixed on a rigid ring-shaped member 114 or 114a easily obtained by stamping and forming a case for the packing. This rigid ring-shaped member is connected to the shaft 111 through the medium of a rubber sleeve 116 or 116a. The frictional washer 113 is in engagement with the end face 117 of the casing 112. According to an arrangement similar to that hereinabove described, a cone-shaped spring 119 or 119a placed in the rubber sleeve 116 or 116a aims to press said washer 113 against said face 117. A thin rubber sheet 118 or 118a is interposed between the rigid member 114 or 114a and the ring-shaped frictional washer 113.

Figure 12:
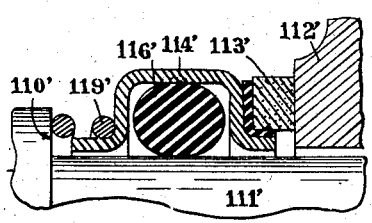

The embodiment shown in Fig. 12 is analogous to that of Figs. 10 and 11, but the rubber sleeve 116' is reduced to an O-ring surrounding the shaft 111'. The rigid member 114' overlays this ring 116'. The spring 119', instead of being in the shape of a cone and of being mounted in a rubber sleeve, is here in the shape of a cylinder and is interposed between the rigid member 114' and a shouldering 110' of the shaft 111', in order to compress the ring-shaped frictional washer 113' between the rigid member 114' and the casing 112'.

Figure 13:
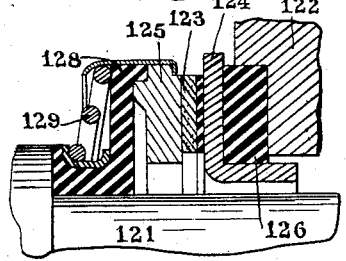
Figure 14:
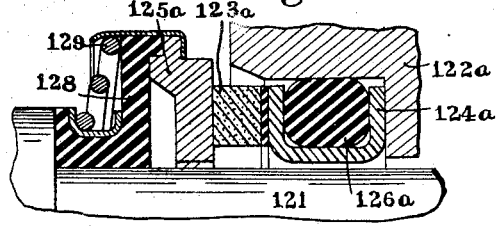

The Figs. 13 and 14 disclose embodiments of joints securing the desired tightness between a shaft 121 and a casing 122 or 122a, and wherein the ring-shaped frictional washer 123 or 123a is stuck on a detachable member 124 or 124a, easily obtained by stamping, said member 124 or 124a being attached to the casing 122 or 122a with interposition of a ring-shaped rubber member 126 or 126a. The washer 123 or 123a is engaged with a rigid ring 125 or 125a. This latter is urged towards the washer 123 or 123a by a conical spring 129 mounted in a rubber collar 128 fixed to the shaft 121.

Figure 19:
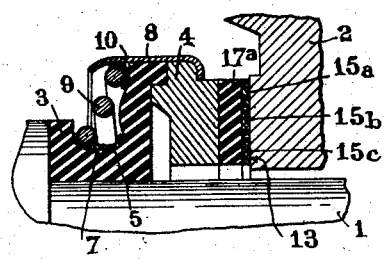
Figure 20:
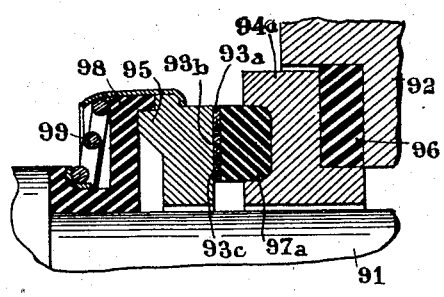
Figure 21:
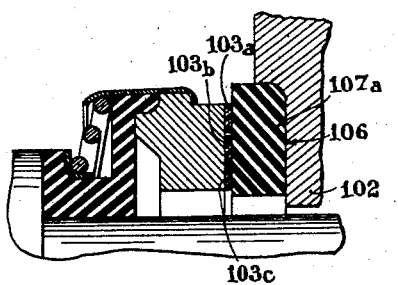

According to the invention and as shown in Figs. 19, 20, 21, it is moreover possible that the friction washers fixed on the rotating or on the fixed part of the device should comprise several concentric ring-shaped washers fixed to a same resilient cushion, this cushion allowing a better distribution of the pressures upon each of said washers. In this case, the resilient cushion will be rather thick.

Thus, Fig. 19 shows a joint similar to that of Fig. 1, but wherein instead of the frictional ring-shaped washer 15 and the rubber sheet 17 is provided a resilient annular cushion 17a whereto are fixed three concentric ring-shaped washers 15a, 15b, 15c.

Fig. 20 shows a packing seal similar to that of Fig. 8, but wherein instead of the rubber sheet and the ring-shaped washer 93 mounted in the ring 94 is provided a resilient annular cushion 97a whereto are fixed three concentric ring-shaped washers 93a mounted in the ring 94a, 93b, 93c.

Fig. 21 shows a packing seal similar to that of Fig. 9, but wherein instead of the rubber sheet and the ring-shaped washer 103 is provided a resilient annular cushion 107a whereto are fixed three concentric ring-shaped washers 103a, 103b, 103c.

All the embodiments of the invention hereinabove disclosed are given as mere examples. Within the scope of the invention, it is also possible:

(1) To provide any other packing similar to those represented in the drawing and adapted for lateral frictional engagement.

(2) To provide different embodiments wherein the fixing means as represented in the drawing are indifferently used:

On the rigid ring of the packing;
On the ring connected to the casing;
On the ring connected to the shaft;
Directly on the casing.

Figure 17:
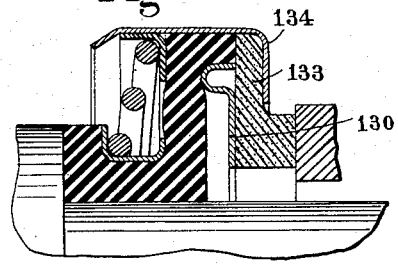
Figure 18:
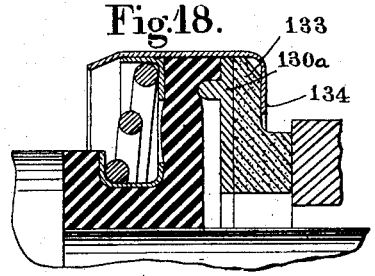

Within the scope of the invention, the friction washer may be made from such a plastic or resilient enough material as graphited rubber or polyamide, this washer being, if desired, directly moulded by injection or compression, on the rigid member whereupon it is supported, without interposition of paste or of a rubber sheet or analogous. Besides, according to such embodiments as represented in Figs. 17 and 18, the friction ring-shaped washer 133 may be pressed between its reinforcement ring 130 or 130a and a rigid ring-shaped member 134 of the packing.

What we claim is:

1. A packing seal to seal one another a part in rotation round an axis and having an annular plane face normal to said axis of rotation and another fixed part having an annular plane face normal to the axis and facing the face of the first part to be sealed, said packing seal comprising a sleeve made from an elastic material, said sleeve being tightly secured to the face of the first part to be sealed and extending in a radial circular flange facing the face of the second part to be sealed, a rigid ring tightly fixed to the circular flange of the sleeve and shaped with an annular plane face normal to the axis and facing the face of the second part to be sealed, a ring-shaped washer made from a friction material, having two opposite annular plane faces perpendicular to the axis, said washer being located in a loose manner for free movement in any direction transverse to the axis, means to limit the amplitude of any transverse movement of the washer to secure the whole areas of the two opposite annular faces of said washer permanently to register with the plane faces, respectively of the rigid ring and of the second part to be sealed, and elastic means urging the circular flange of the sleeve in the direction of the plane face of the second part to be sealed, thus urging the rigid ring against the ring-shaped washer and pressing the opposite annular plane faces of said washer in frictional engagement with the plane faces, respectively of the rigid ring and of the second part to be sealed.

2. A packing seal to seal one another a part in rotation, round an axis and having an annular plane face normal to said axis of rotation and another fixed part having an annular plane face normal to the axis and facing the face of the first part to be sealed, said packing seal comprising a sleeve made from an elastic material, said sleeve being tightly secured to the face of the first part to be sealed and extending in a radial circular flange facing the face of the second part to be sealed, a rigid ring tightly fixed to the circular flange of the sleeve and formed with an annular plane face normal to the axis and facing the face of the second part to be sealed, a ring-shaped washer made from a friction material, having two opposite annular plane faces perpendicular to the axis, said washer being located, in a loose manner for free movement in any direction transverse to the axis between the rigid ring and the second part to be sealed, a centering ring rigidly and centrally engaged in said rigid ring, which has an outer diameter smaller than the inner diameter of the washer and entering the inner cylindrical space of said washer, said centering ring centrally guiding the ring-shaped washer and holding said washer in a position wherein its two opposite annular plane faces register with the plane faces, respectively of the rigid ring and of the second part to be sealed, and elastic means urging the circular flange of the sleeve in the direction of the plane face of the second part to be sealed, thus pressing the rigid ring against the ring-shaped washer and the opposite annular plane faces of said washer for frictional engagement with the plane faces, respectively, of the rigid ring and of the second part to be sealed.

3. A packing seal to seal one another a part in rotation round an axis and having an annular plane face normal to said axis of rotation and another fixed part having an annular plane face normal to the axis and facing the face of the first part to be sealed, said packing seal comprising a sleeve made from an elastic material said sleeve being tightly secured to the face of the first part to be sealed and extending in a radial circular flange facing the face of the second part to be sealed, a rigid ring tightly fixed to the circular flange of the sleeve and formed with an annular plane face normal to the axis and facing the face of the second part to be sealed, a ring-shaped washer made from a friction material, having two opposite annular plane faces perpendicular to the axis, said washer being located in a loose manner for free movement in any direction transverse to the axis between the rigid ring and the second part to be sealed, a centering ring rigidly engaged around the rigid ring having an inner diameter larger than the outer diameter of the washer and at least partially surrounding said washer, said centering ring peripherally guiding the ring-shaped washer and holding said washer in a position wherein its two opposite annular plane faces register with the plane faces respectively of the rigid ring and of the second part to be sealed, and elastic means urging the circular flange of the sleeve in the direction of the plane face of the second part to be sealed, thus pressing the rigid ring against the ring-shaped washer for frictional engagement with the plane faces respectively of the rigid and of the second part to be sealed.

References Cited in the file of this patent

UNITED STATES PATENTS

| | | |
|---|---|---|
| 2,233,624 | Magnesen | Mar. 4, 1941 |
| 2,365,351 | Matter | Dec. 19, 1944 |
| 2,443,151 | Schmitz | June 8, 1948 |
| 2,615,739 | Vedovell | Oct. 28, 1952 |